United States Patent [19]

Conrad

[11] Patent Number: 4,818,557
[45] Date of Patent: Apr. 4, 1989

[54] BRAN-GLUTEN MEAT REPLACEMENT PRODUCT AND MEAT PRODUCTS COMPRISING SAME

[76] Inventor: Ernst Conrad, Postlåda 2150 B, Höganäs, Sweden, S-263 00

[21] Appl. No.: 120,202

[22] Filed: Nov. 5, 1987

Related U.S. Application Data

[63] Continuation of Ser. No. 912,154, Sep. 24, 1986, abandoned, which is a continuation of Ser. No. 802,947, Nov. 27, 1985, abandoned, which is a continuation of Ser. No. 289,810, Aug. 3, 1981, abandoned.

[30] Foreign Application Priority Data

Aug. 12, 1980 [SE] Sweden .................................. 8005667

[51] Int. Cl.$^4$ .......................... A23L 1/10; A23L 1/317
[52] U.S. Cl. .................................. 426/618; 426/622; 426/646; 426/656
[58] Field of Search .............. 426/618, 622, 646, 652, 426/481, 656, 804

[56] References Cited

U.S. PATENT DOCUMENTS

| | | | |
|---|---|---|---|
| 3,124,466 | 3/1964 | Ziegenfuss | 426/618 X |
| 3,197,310 | 7/1965 | Kjelson | 426/618 X |
| 3,651,768 | 3/1972 | Hyppola | 426/622 X |
| 3,873,736 | 3/1975 | Palmer et al. | 426/646 X |
| 3,952,111 | 4/1976 | Desrosier | 426/622 X |
| 4,011,345 | 3/1977 | Bartsch | 426/335 X |
| 4,071,635 | 1/1978 | Lindl et al. | 426/652 X |
| 4,238,515 | 12/1980 | Shemer | 426/656 X |
| 4,282,319 | 0/1900 | Conrad | 435/69 |
| 4,320,152 | 3/1982 | Fradin | 426/622 X |

FOREIGN PATENT DOCUMENTS 1283112  7/1972  United Kingdom .

*Primary Examiner*—Arthur L. Corbin
*Attorney, Agent, or Firm*—Brumbaugh, Graves, Donohue & Raymond

[57] ABSTRACT

The present invention relates to a meat replacement product to be used in mixed minced meat products, process for its preparation, and meat products comprising same, whereby the meat replacement product comprises the gluten protein and the bran fractions of whole cereal grain, preferably wheat. To the gluten-bran fraction a blood hemoglobin fraction can be added as well as a milk protein in the form of cheese fines. The meat replacer can replace up to 50% of the meat.

8 Claims, No Drawings

BRAN-GLUTEN MEAT REPLACEMENT PRODUCT AND MEAT PRODUCTS COMPRISING SAME

This application is a continuation of Ser. No. 912,154 filed Sept. 24, 1986, now abandoned which is a continuation of Ser. No. 802,947, filed Nov. 27, 1985 now abandoned, which is a continuation of 289,810 filed Aug. 03, 1981 now abandoned.

The present invention relates to meat replacement products, a process for the preparation of meat replacement products, as well as meat products containing such meat replacement products.

The object of the present invention is to replace some of the contents of mixed meat products with meat replacement products obtained from cereals, and particularly from whole wheat.

BACKGROUND OF THE INVENTION

It is previously known to add starch to minced meat products in order to obtain a binding effect. Thus, it is known to add potatoe starch to minced meat, and sausage raw material.

It is also known to replace some of the animal meat tending to be somewhat expensive with soybean meal which is a protein rich vegetable product.

People of today have too little fibre in their food, and it has been determined that people in general only have half the daily intake which is regarded necessary to obtain a correct intestinal function.

It would be desirable from a nutritional point of view and from a cost benefit point of view to be able to replace some of the meat in minced meat products, such as minced meat balls, minced meat baeufs, burgers, sausages of different type and the like, with a vegetable preferably cereal product, whereby the amino acid composition of the final product can be varied and whereby the costs can be lowered compared with a pure meat product.

DISCLOSURE OF THE INVENTION

These demands have now been solved surprisingly using a grain product, preferably a wheat product, which alone or in combination with blood products and/or milk protein products can form a grain or preferably a wheat meat, which can replace meat in minced mean products thereby allowing a nutritional change and a lowering of costs.

The present invention is characterized in that it comprises the gluten protein fraction and the bran fraction from whole cereal grain.

A preferred embodiment of the invention is characterized in that the meat replacement product is gluten protein and bran from wheat.

Another preferred embodiment of the invention is characterized in that it further comprises the hemoglobin part of whole blood from slaughtered animals, preferably in an amount of up to 10% by weight dry weight of the gluten-bran product dry weight, preferably 4–6% by weight.

A further, preferred embodiment of the invention is characterized in that it further comprises a milk protein product, preferably cheese fines in an amount of up to 40% by weight dry weight of the gluten-bran product dry weight, preferably 20–35% by weight. Cheese fines are obtained as a filter cake product when filtering whey after cheese production.

The grain meat, preferably wheat meat, although it can be made of corn (maize), barley, oat, and rye as well, is prepared from the whole grain which after crushing is separated into two main components, viz a solid phase—grain meat—and a suspended aqueous phase—starch granules containing most of the water-soluble components of the grain such as soluble proteins, salts, and sugars.

According to another object of the invention meat products are obtained containing the meat replacement product, whereby the latter can replace up to 50% by weight dry weight of the meat comprised in a mixed meat product.

The grain meat comprises all the gluten protein and bran contents of the grain as well as a minor amount of starch granules if a certain binding (glueing) effect should be desired in e.g. a sausage mass. The size of the fibers can be chosen and be further divided by a following disintegration of the bran.

The suspended aqueous phase of starch granules can be used directly in the production of glue or in the production of sugars by hydrolysis in a way known per se.

The production of wheat meat encompasses two main steps, vis: (1) a crushing of the wheat grain to a suitable size, and (2) a mechanical treatment and separation of fractions. Process: The wheat grain is disinfected by a washing with a 0.1% aqueous solution of $H_2O_2$. The wash water is removed. The wheat grains are allowed to pass between two rollers rotating towards each other with a roller opening of at most 0.5 mm, whereby the kernel is laid open. Thereupon the kernel is crushed to a particle size of 0.5 to 3 mm, whereby a hammer-mill is preferably used having a sieve with 3 mm holes.

It is important, from a process-technical point of view, that the final ground product has a size of 0.5 to 3 mm in length and 0.5 mm in width. If the length should exceed 3 mm and the width should exceed 0.5 mm an inferior separation of gluten and bran from the starch granules is obtained, as the gluten is then not freed enough but adheres to the starch granules. Further, an inferior separation is obtained of the bran from the starch granules if the bran is ground to a length below 0.5 mm as they will then pass through a sieve to pollute the starch slurry.

The gluten protein content and the bran content vary depending on which grain is used to produce it. Starting with wheat grain, the gluten protein fraction is about 50% of the final product and thus the bran is about 50%.

Starting with cereals with lower protein contents, the bran part will exceed 50% and can in certain cases reach very high levels when corn is used.

From a taste point of view, in order to obtain the right chewing properties of the end product the ratio of gluten: bran should be 0.5–1.5:1, whereby gluten or bran can be added to give right proportions to a product if it developes that the grain can not give a product within said range.

EXAMPLE 1

1,000 g of crushed wheat is kneaded with 750 g of water provided with 0.1% of $H_2O_2$. To the dough 2,000 g of 0.1% aqueous solution of $H_2O_2$ are added. During the mechanical treatment, the starch granules having a diameter of 0.003–0.03 mm are made free and are suspended in the water. The insoluble gluten protein fraction and the bran fraction form a solid mass. The slurry is separated by sieving on a sieve with a mesh size of at most 0.1 mm.

| Yields: | |
|---|---|
| Charged: | 1,000 g of wheat crush |
| | 2,750 g of water |
| Obtained: | 800 g of wheat meat |
| | 2,830 g of starch milk. |

| Analyses: | | |
|---|---|---|
| Charged: | | |
| Wheat crush: | $H_2O$ | 130 g |
| | Starch | 580 g |
| | Protein | 131 g |
| | Bran fibers | 113 g |
| | Wheat germ | 21 g |
| | Salts | 25 g |
| | | 1,000 g |
| Obtained: | | |
| Wheat meat: | $H_2O$ | 520 g |
| | Starch | 31 g |
| | Protein | 122 g |
| | Bran fibers | 112 g |
| | Wheat germ | 20 g |
| | Salts | 5 g |
| | | 800 g |
| Starch milk: | $H_2O$ | 2,250 g |
| | Starch | 549 g |
| | Protein | 9 g |
| | Fibers | 1 g |
| | Wheat germ | 1 g |
| | Salts | 20 g |
| | | 2,830 g |

Of the process herein described the bran (fibers) of the wheat having a maximal size of 3 mm will appear in the final product as brown spots or points.

As previously noted, the final grinding of the wheat bran should take place in a mill with a 3 mm sieve in order to avoid too fine a product which would cause a separation problem. After sieving, obtained wheat meat can be further disintegrated with regard to the size of the bran. This can take place in a meat mincing apparatus, a so called cutter, the knives of which have been adjusted to a suitable distance of 0.5 mm. Hereby the bran is cut to a nonnoticeable size.

Comparison

Minced meat product raw material consists mainly of beef and swine meat. The compositions of such meats in comparison with the wheat meat of the invention are given below.

TABLE 1

| | Meat | | |
|---|---|---|---|
| Compound | Beef | Swine | Wheat meat |
| Water | 73% | 65% | 65% |
| Starch | 0% | 0% | 3% |
| Bran-fiber | 0% | 0% | 14% |
| Proteins | 22 | 19% | 15% |
| Fat | 3% | 12% | 0% |
| Wheat germ incl. wheat germ oil | 0% | 0% | 2.5% |
| Salts | 2% | 4% | 0.5% |
| | 100% | 100% | 100% |

It is evident from the table that the wheat meat is completely free from high essential animal fat but contains a low essential vegetable wheat germ oil with its vitamin E contents.

The wheat meat described has a brown-yellow colour deriving partly from the brown bran and partly from the yellow gluten. The colour can advantageously be transferred into meat colour by adding thereto up to 15% by weight of blood, preferably the hemoglobin part separated off from blood, the protein content of which is about 90% by weight and the dry substance contents are 33% by weight.

It is to be noted that the dry substance contents of wheat meat are about 33 to 35% by weight and the addition of blood thus not changes the dry substance. The addition of blood/hemoglobin further gives a desired taste improvement as it improves the meat flavour of the final product.

Further, the wheat meat can be combined with a number of other protein products, preferably milk protein (casein).

In the production of cheese, a grainy foam product, named cheese fines, is obtained in the final pressing of the precipitated cheese mass. These cheese fines not used in new cheese preparation steps, but is sold as feeding stuff for animals. It has a dry substance content of about 30 to 35% by weight and contains in the dry substance about 85% of milk protein, 5% of lactose, 5% of fat, and 5% of salts.

These cheese fines can also be advantageously combined with the wheat meat. The new combination then contains 3-component proteins in the form of vegetable, animal, and milk proteins.

Such a combination can comprise:

TABLE 2

| Product | Amount in g | DS in % | Protein in DS % | Protein in g |
|---|---|---|---|---|
| Wheat meat | 1,500 | 33 | 46 | 230 |
| Cheese fines | 500 | 33 | 85 | 140 |
| Hemoglobin | 100 | 33 | 90 | 30 |
| Wheat meat CH | 2,100 | 33 | 57 | 400 |

The combination of Table 2 above has the same protein content as swine meat, 19%, but a more varied amino acid composition.

The production of minced meat products can take place by recalculation of original recipes and thereby the meat mass in such a way that up to 50% by weight of the meat part can be replaced by wheat meat, or any wheat meat combination, as the one above.

EXAMPLE 2

Preparation of sausage to be sliced and used on top of a sandwich

| Original recipe: | | |
|---|---|---|
| Lard | | 32% by weight |
| Swine meat | 50 | 39% by weight |
| Beef meat | | 11% by weight |
| Starch | | 8% by weight |
| Salt | | 2% by weight |
| Dry milk | | 3% by weight |
| Spices | | 2.5% by weight |
| Onion | | 2.5% by weight |

| Wheat meat CH recipe: | |
|---|---|
| Lard | 32% by weight |

| Wheat meat CH recipe: | |
|---|---|
| Swine meat | 25% by weight |
| Wheat meat CH of Table 2 | 25% by weight |
| Starch | 8% by weight |
| Salt | 2% by weight |
| Dry milk | 3% by weight |
| Spices | 2.5% by weight |
| Onion | 2.5% by weight |

All raw materials are ground or cut together to a smooth paste, which is put into skins to give a sausage having a diameter of 5 cm, and is cold smoked for 24 hrs. The weight loss for the sausage of the original recipe during the cold smoking process was 17%, compared with a weight loss of 13% by weight for wheat meat sausage. This depends on the waterbinding fibers of the wheat meat which fibers have a waterbinding capacity of up to 5 times their own weight.

EXAMPLE 3

Preparation of minced meat balls.

Minced meat balls are generally prepared from so called mixed forcemeat consisting of 50% by weight of beef meat and 50% by weight of swine meat. By replacing 50% of the beef meat (i.e. 25% of the total meat) with the same amount of pure wheat meat and replacing the remaining 50% of the expensive beef meat with cheaper swine meat a meat ball forcemeat comprising 75% of swine meat and 25% of wheat meat is obtained. In a comparative testing frying ordinary meat balls (50-50 beef meat-swine meat) and wheat meat balls (75-25 swine meat-wheat meat) the water loss is only about 6% in the latter compared with 10% for the prior ones, due to the waterbinding capacity of the fibers present.

| Recipe | |
|---|---|
| Minced swine meat | 750 g |
| Pure wheat meat | 250 g |
| Egg | 40 g |
| Boiled potatoes | 60 g |
| Onions | 2 pieces |
| Salt and spices | q.s. |

All ingredients are thoroughly mixed and fried in a conventional way.

I claim:

1. A meat replacement product for use in minced meat products which comprises a grain meat, said grain meat consisting essentially of gluten protein and bran concurrently derived from a whole cereal grain by removal of substantially all of the water soluble components from the grain wherein the ratio of gluten to bran ranges from 0.5:1 to 1.5:1.

2. A meat replacement product according to claim 1, in which the gluten protein and bran are derived from whole wheat grain.

3. A meat replacement product according to claim 1 or 2, which further comprises a hemoglobin fraction of whole blood from slaughtered animals in an amount of up to 15% by dry weight of the grain-meat dry weight.

4. A meat replacement product according to claim 3, in which the hemoglobin fraction is 4 to 6% by weight.

5. A meat replacement product according to claim 1 or 2 which further comprises a milk protein product in the form of cheese fines in an amount up to 40% by dry weight of the grain-meat dry weight.

6. A meat replacement product according to claim 5, in which the cheese fines are 20 to 35% by weight.

7. Meat products of minced meat which comprise a meat replacement product of claim 1 or 2 in an amount of up to 50% by dry weight of the meat contents.

8. Meat products according to claim 7 in which the grain-meat is present in an amount of 10 to 25% by dry weight.

* * * * *

UNITED STATES PATENT AND TRADEMARK OFFICE
CERTIFICATE OF CORRECTION

PATENT NO. : 4,818,557
DATED     : April 4, 1989
INVENTOR(S) : Ernst Conrad

It is certified that error appears in the above-identified patent and that said Letters Patent is hereby corrected as shown below:

First page, second column, eighth line, "0/1900" should read --8/1981--;

Col. 2, line 58, "developes" should read --develops--;

Col. 3, line 60, "22" should read --22%--;

Col. 4, line 22, after "fines" insert --are--;

Col. 4, line 23, "is" should be --are--; and

Col. 4, following TABLE 2, insert --DS = dry solid--.

Signed and Sealed this

Seventeenth Day of April, 1990

Attest:

HARRY F. MANBECK, JR.

Attesting Officer

Commissioner of Patents and Trademarks